United States Patent [19]

Akimoto et al.

[11] Patent Number: 5,300,548

[45] Date of Patent: Apr. 5, 1994

[54] PROCESS FOR THE PREPARATION OF A GRAFT COPOLYMER INCLUDING A MONOMER OF ESTERS OF UNSATURATED CARBOXYLIC ACIDS OR VINYL ESTERS AND POLYAMIDE OLIGOMERS

[75] Inventors: Hideo Akimoto; Shiro Narasaki; Reiji Miyamoto, all of Ichihara, Japan

[73] Assignee: Du Pont-Mitsui Polychemicals Co., Ltd., Tokyo, Japan

[21] Appl. No.: 967,560

[22] Filed: Oct. 27, 1992

Related U.S. Application Data

[60] Continuation of Ser. No. 718,235, Jun. 20, 1991, abandoned, which is a division of Ser. No. 403,659, Sep. 6, 1989, Pat. No. 5,049,626.

[30] Foreign Application Priority Data

Sep. 8, 1988 [JP] Japan ................... 63-225730
Aug. 17, 1989 [JP] Japan ...................... 1-65423

[51] Int. Cl.$^5$ .................. C08G 67/02; C08L 33/06; C08L 93/04
[52] U.S. Cl. ..................... 524/271; 524/272; 524/556; 525/190; 525/426
[58] Field of Search ............... 525/426, 190; 524/271, 524/272, 556

[56] References Cited

U.S. PATENT DOCUMENTS

| | | | |
|---|---|---|---|
| 2,457,279 | 12/1948 | Scott | 260/66 |
| 3,780,140 | 12/1973 | Hammer | 260/884 |
| 3,972,961 | 8/1976 | Hammer et al. | 280/857 |
| 4,174,358 | 11/1979 | Epstein | 525/183 |
| 4,217,430 | 8/1980 | Starkweather, Jr. et al. | 525/183 |
| 4,225,476 | 9/1980 | Hanmer et al. | 525/183 |
| 4,391,923 | 7/1983 | Rys-Sikora | 521/96 |
| 4,434,261 | 2/1984 | Brugel et al. | 524/13 |

FOREIGN PATENT DOCUMENTS

| | | |
|---|---|---|
| 1720773 | 7/1971 | Fed. Rep. of Germany . |
| 2149932 | 3/1973 | France . |
| 165427 | of 1982 | Japan . |
| 2028343 | 3/1980 | United Kingdom . |

OTHER PUBLICATIONS

Loudon, G. M. "Organic Chemistry", Addison-Wesley Pub. Co. Reading, Mass. (1984) p. 904.
European Search Report dated Jan. 27, 1992.

*Primary Examiner*—James J. Seidleck
*Assistant Examiner*—Thomas Hamilton, III
*Attorney, Agent, or Firm*—Webb, Burden, Ziesenheim & Webb

[57] ABSTRACT

Disclosed herein are a novel graft copolymer comprising a stock copolymer (A) of at least one monomer selected from esters of unsaturated carboxylic acids and vinyl esters (a), ethylene (b) and carbon monoxide (c), and a polyamide oligomer having a primary amino group at one end of its molecule (B) grafted on said stock copolymer, and a process for the preparation thereof. The proposed graft copolymer, when used as an adhesive, in particular for adhesion of polyvinyl chloride, exhibits excellent heat resistance and adhesion properties.

2 Claims, 7 Drawing Sheets

PROCESS FOR THE PREPARATION OF A GRAFT COPOLYMER INCLUDING A MONOMER OF ESTERS OF UNSATURATED CARBOXYLIC ACIDS OR VINYL ESTERS AND POLYAMIDE OLIGOMERS

This is a continuation of copending application Ser. No. 07/718,235 filed on Jun. 20, 1991, now abandoned, which is a divisional of copending application Ser. No. 07/403,659 filed on Aug. 6, 1989, now U.S. Pat. No. 5,049,626.

FIELD OF THE INVENTION

The invention relates to a novel graft copolymer comprising a stock copolymer of ethylene, a vinyl monomer and carbon monoxide which is excellent in heat resistance and adhdesion properties. It also relates to a process for the preparation of such a graft copolymer and to use of the graft copolymer.

BACKGROUND OF THE INVENTION

Non-rigid vinyl chloride resins have advantageous properties including flexibility, transparency and toughness, and some of the properties such as flexibility can be controlled at will by varying the amount of a plasticizer added. For these reasons, they are widely used in various applications including films, sheets, and extrusion molded articles. However, adhesion of non-rigid vinyl chloride resins is not necessarily easy. While many proposals have been made on adhesives for non-rigid vinyl chloride resins, none of them has been found completely satisfactory. Many of the prior art adhesives for non-rigid vinyl chloride resins comprises a solution of an adhesive ingredient such as chloroprene rubbers, nitrile rubbers and polyesters. Because of the use of a solvent, solution type adhesives have posed problems of pollution of working environment, need of a step of drying the solvent and expensive costs involved.

There have been already known solvent free adhesives which can realize thermal adhesion without suffering from the above-mentioned problems and which can be used in adhesion of non-rigid vinyl chloride resins. Such known adhesives include, for example, those based on copolymers of ethylene and vinyl acetate having vinyl chloride grafed (Japanese Patent Laid-open Publication No, 57-167,362), carboxylated copolymers of ethylene and vinyl acetate (Japanese Patent Laid-open Publication No, 59-52,174) and copolymers of ethylene, vinyl acetate and carbon monoxide (Japanese Patent Laid-open Publication No, 57-165,427). However, these copolymers have relatively low melting points, and therefore, when an adherend coated with an adhesive comprising the copolymer mentioned above is exposed to a hot atmosphere, adhesive failure frequently takes place even with a slight shearing.

In view of the state of the art, as discussed above, we have studied to seek for an adhesive which is excellent in heat resistance and capable of realizing thermal adhesion. As a result we have found that a novel graft copolymer comprising a stock copolymer (A) of at least one monomer selected from esters of unsaturated carboxylic acids and vinyl esters (a), ethylene (b) and carbon monoxide (c), and a polyamide oligomer having a primary amino group at one end of its molecule (B) grafted on said stock copolymer, is excellent in heat resistance, can realize thermal adhesion and, moreover, has other desirable properties. The invention is based on these findings.

OBJECT OF THE INVENTION

An object of the invention is to provide a novel graft copolymer which is excellent in heat resistance and has desirable properties including being capable of realizing thermal adhesion.

Another object of the invention is to provide a novel graft copolymer which can realize thermal adhesion at relatively low temperatures on non-rigid vinyl chloride resins and other substrates, while exhibiting excellent adhesion properties, particularly excellent heat resistant adhesion property.

Still another object of the invention is to provide a novel graft copolymer which has improved heat distortion resistance and heat resistant adhesion properties, compared with those of the starting stock copolymer (A), and which, novel graft copolymer when laminated with a non-rigid vinyl chloride resin, exhibits a reduced tendency of being swelled with a plasticizer contained in the resin.

A further object of the invention is to provide a process for the preparation of the novel graft copolymer according to the invention.

These and other objects of the invention will become apparent from the description noted below.

SUMMARY OF THE INVENTION

The novel graft copolymer according to the invention comprises a stock copolymer (A) of at least one monomer selected from esters of unsaturated carboxylic acids and vinyl esters (a), ethylene (b) and carbon monoxide (c), and a polyamide oligomer having a primary amino group at one end of its molecule (B) grafted on said stock copolymer.

The novel graft copolymer according to the invention can be prepared by graft polymerizing the polyamide oligomer (B) above onto the stock copolymer (A) above. The graft polymerization is preferably carried out in the presence of a carboxyl group containing compound having a number average molecular weight of from 200 to 10,000 and an acid value of from 15 to 300.

The novel graft copolymer according to the invention, when used as an adhesive, in particular for polyvinyl chloride, exhibits desirable adhesion properties.

DETAILED DESCRIPTION OF THE INVENTION

Figure 1:
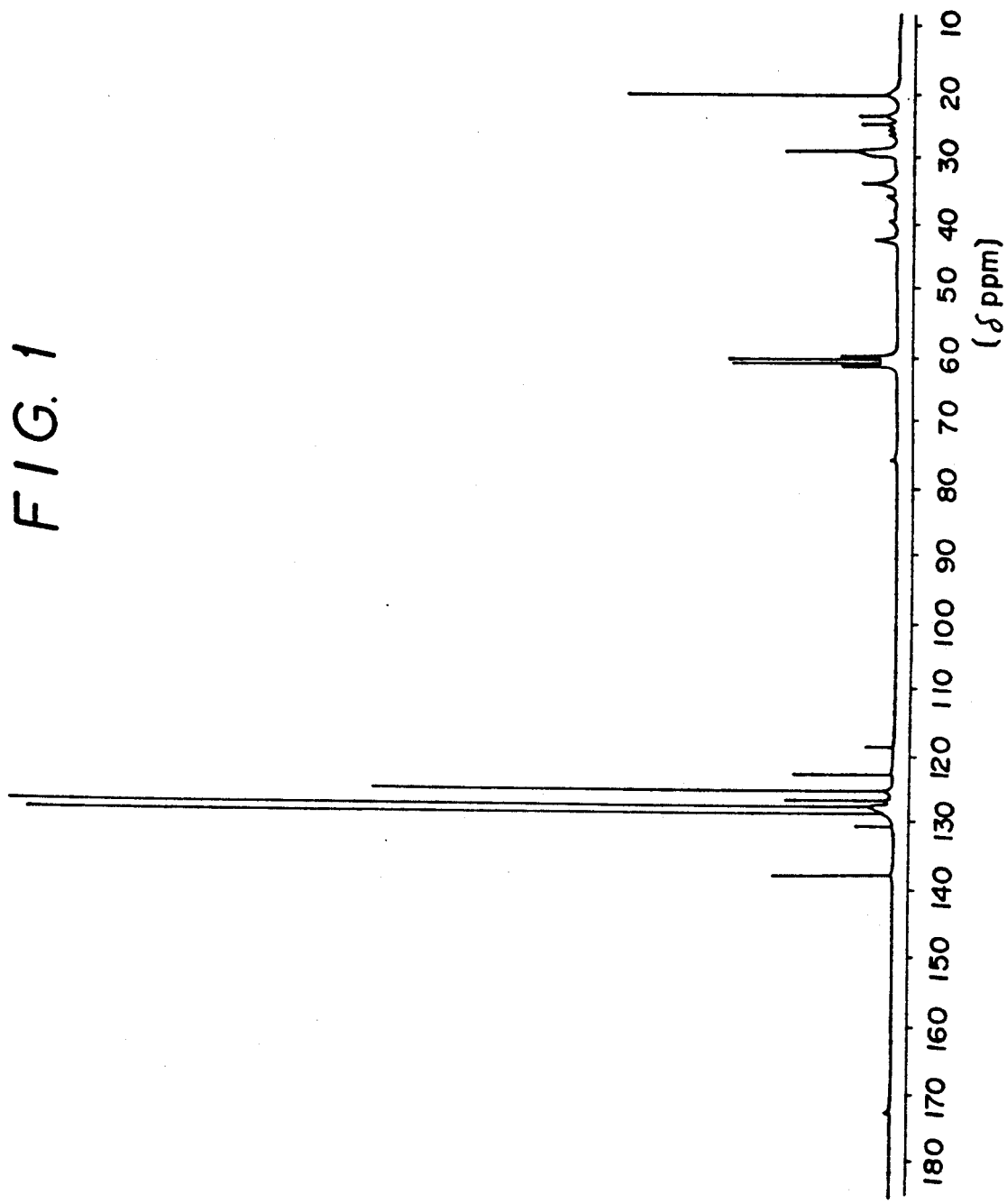
FIG. 1 shows a $^{13}$C-NMR absorption spectrum of a graft copolymer of Example 4.

The novel graft copolymer according to the invention, the process for the preparation thereof and use thereof will now be described in detail.

The novel graft copolymer according to the invention comprises a stock copolymer (A) obtained by copolymering at least one monomer selected from esters of unsaturated carboxylic acids and vinyl esters (a), ethylene (b) and carbon monoxide (c), and a polyamide oligomer having a primary amino group at one end of its molecule (B) grafted on said stock copolymer.

The monomer (a) is selected from the group consisting of esters of unsaturated carboxylic acids and vinyl esters. As the esters of unsaturated carboxylic acids, preferred are those derived from an $\alpha,\beta$-unsaturated carboxylic acid such as acrylic acid, methacrylic acid and maleic acid and a straight or branched alcohol having from 1 to 10 carbon atoms such as methanol, ethanol, isopropanol, n-propanol, isobutanol, n-butanol, sec.-butanol, n-hexanol, n-octanol, 2-ethylhexanol and n-decanol.

Examples of the esters of unsaturated carboxylic acids include, for example, methyl (meth)acrylate, ethyl (meth)acrylate, isobutyl (meth)acrylate, n-butyl (meth)acrylate, 2-ethylhexyl (meth)acrylate, phenyl (meth)acrylate and dimethyl maleate.

Examples of the vinyl esters which can be used herein as the monomer (a) include, for example, vinyl formate, vinyl acetate and vinyl propronate.

A preferred stock copolymer (A) is composed of from 10 to 50%, preferably from 20 to 40%, by weight of said monomer (a), from 20 to 89%, preferably from 40 to 78%, by weight of ethylene (b) and from 1 to 30%, preferably from 2 to 20%, by weight of carbon monoxide (c). If the carbon monoxide content of the stock copolymer is less than 1% by weight, it is not easy to graft an increased amount of the polyamide oligomer to such a stock copolymer, making it difficult to prepare a graft copolymer of good quality. Whereas unduly high carbon monoxide content in excess of 30% by weight adversely affects weather resistance of the graft copolymer, and thus, limits the application fields of the product. When the graft copolymer according to the invention is intended to be used as an adhesive, the stock copolymer preferably contains from 5 to 20% by weight of oxygen.

While the optimum molecular weight of the stock copolymer (A) depends upon the intended use of the graft copolymer, the stock copolymer preferably has a weight average molecular weight of from $10^4$ to $10^6$, in particular from $10^4$ to $5 \times 10^5$, as measured by gel permeation chromatography (GPC). In the gel permeation chromatography used herein the measurment was carried out at 135° C. using o-dichlorobenzene as a solvent, and the measured value was calculated in terms of the molecular weight of polystyrene used as a standard.

The stock copolymer (A) which can be used herein is well known in the art, and can be generally prepared by radical copolymerization of the monomer (a), ethylene (b) and carbon monoxide (c) at a temperature of 150°–250° C. and under a pressure of 500–3000 kg/cm² in bulk. It can also be prepared by the radical copolymerization in solution or emulsion.

The graft copolymer according to the invention comprises the stock copolymer (A) described above and a polyamide oligomer having a primary amino group at one end of its molecule (B) grafted on the stock copolymer (A). That is, side chains derived from the polyamide oligomer (B) are bonded to the stock copolymer (A).

The polyamide oligomer (B) used herein has a primary amino group at one end of the molecule and a carboxyl group at the other end of the molecule, which has usually been inactivated by encapsulating(endcapping) with a primary amine. The encapsulation of the carboxyl group of the polyamide oligomer with a primary amine may be carried out by a method known per se. The graft copolymerization of the stock copolymer (A) with the polyamide oligomer (B) proceeds by the reaction of the primary amino group at one end of the molecule of the polyamide oligomer (B) and a carbonyl group contained in the stock copolymer (A).

The reaction of the carbonyl group in the stock copolymer (A) and the terminal primary amino group in the polyamide oligomer is presumed to be formation of a pyrrole ring or Schiff's base, as illustrated by the following schemes.

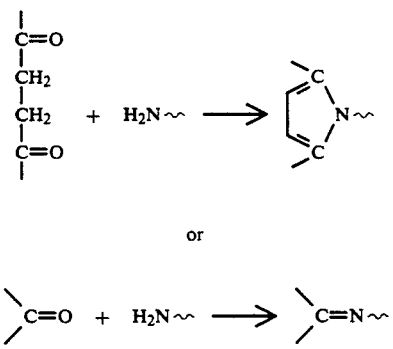

The formation of the graft copolymer according to the invention can be confirmed, for example, by thin layer chromatography. For example, when a graft copolymer is spotted on a thin layer of silica gel and then developed with 1:1 toluene-2,2,2-trifluoroethanol mixture, it exhibits a $R_f$ value distinct from those of the starting materials. In fact, while the polyamide oligomer and stock copolymer normally exhibit $R_f$ values of 0 and from 0.3 to 0.8, respectively, the $R_f$ value of the graft copolymer is normally on the order of from 0.1 to 0.2.

The polyamide oligomer (B) should preferably have a number average molecular weight of from 600 to 10,000, preferably from 600 to 4,000. With polyamide oligomers having a number average molecular weight of less than 600, an appreciable improvement to heat resistance of the resulting copolymer will not be attained. A number average molecular weight substantially in excess of 10,000 retards the graft reaction, making it difficult to enhance the graft efficiency.

As the polyamide oligomer (B), there can be used herein homopolymers and copolymers of various lactams having from 4 to 12 carbon atoms, $\omega$-aminocarboxylic acids having from 3 to 16 carbon atoms and nylon salts of aliphatic alicyclic or aromatic dicarboxylic acid and aliphatic alicyclic or aromatic diamine having from 3 to 16 carbon atoms. One of terminal of the polyamide oligomer is encapsulated with a primary amine having from 1 to 20 carbon atoms.

Examples of such polyamide oligomer (B) include, for example, homopolymers and copolymers of caprolactam, laurolactam and hexamethylene diammonium adipate, such as oligomers of nylon 6, nylon 66, nylon 11, nylon 12, nylon 6/66, nylon 6/12 and nylon 46, with one terminal of the molecule end-capped(encapsulated) with n-butyl amine, n-hexyl amine n-octyl amine or other primary amine.

The melting point of the polyamide oligomer (B) is preferably from 130° to 230° C. The melting point of the polyamide oligomer may be adjusted by selecting the kind of monomer used in cases of homopolymers and the kind and proportion of the monomers used in cases of copolymers.

If a polyamide oligomer which is not end-capped with a primary amine at one end of the molecule is grafted onto the stock copolymer (A), the molecular weight of the oligomer is increased during the grafting, and thus, it becomes difficult to efficiently prepare the desired graft copolymer. On the other hand, if a polyamide oligomer having primary amino groups at both the terminals of the molecule is grafted onto the stock copolymer (A), cross-linking takes place along, and thus, it becomes difficult to prepare a graft copolymer having good processability.

The graft copolymer according to the invention preferably comprises from 60 to 99 parts, in particular from 70 to 98 parts, by weight of the stock copolymer (A) and from 1 to 40 parts, in particular from 2 to 30 parts, by weight of the polyamide oligomer (B) grafted on the stock copolymer (A), although the proportion may vary depending upon the intended use of the graft copolymer. With unduly small amount of the grafted polyamide oligomer (B), an appreciable improvement to heat resistance will not be achieved. Whereas if the amount of the grafted polyamide oligomer (B) exceeds the upper limit mentioned above, the resulting graft copolymer will have insufficient adhesive properties for use in adhesion of non-rigid vinyl chloride resins, although it may have an improved heat resistance.

The graft copolymer according to the invention can be prepared by bringing the stock copolymer (A) in intimate contact with the polyamide oligomer (B) in the presence or absence of a solvent. The reaction temperature may normally be within the range between 50° and 250° C. If a solvent is used, such solvents capable of dissolving both the starting materials as fluorine-containing alcohols, for example, 1,1,1,3,3,3-hexafluoroisopropanol and 2,2,2-trifluoroethanol are preferred. When no solvent is used, both the starting materials may be brought in intimate contact to each other by sufficiently kneading them together at a temperature above their melting points.

While the graft polymerization of the polyamide oligomer (B) onto the stock copolymer (A) does not require any catalyst, it can be accelerated by the presence of an acid. Suitable acids include, for example, sulfuric acid, hydrochloric acid, phosphoric acid and other inorganic acids as well as p-toluenesulfonic acid, chloroacetic acid, trifluoroacetic acid and other organic acids.

It has been found advantageous to prepare the graft copolymer according to the invention by reacting the stock coplymer (A) and the polyamide oligomer (B) in the presence of a carboxyl group containing compound having a number average molecular weight of from 200 to 10,000, preferably from 250 to 5,000 and an acid value of from 15 to 300, preferably from 30 to 200 . If the number average molecular weight of the carboxyl group containing compound used is unduly low, the resulting copolymer tends to contain an undesirably high content of volaties. Whereas carboxyl group containing compounds having a number average molecular weight of substantially in excess of the above-mentioned upper limit tend to be incompatible with the starting materials, leading to reduction in effect of accelerating the reaction. Likewise, smaller acid numbers than prescribed above tend to lead to reduction in the catalytic activity of the carboxyl group containing compound. On the other hand, unduly large acid numbers tend to invite incompatibility of the carboxyl group containing compound with the starting materials.

Suitable carboxyl group containing compounds include, for example, waxes such as montanic acid, montan wax and polyethylene wax grafted with acrylic acid; carboxyl group containing tackifying resins such as rosin, hydrogenated rosin, partially esterified rosin and hydrocarbon resins grafted with acrylic acid; carboxyl group containing liquid rubbers such as carboxylated polyisoprene and carboxylated polybutadiene; and carboxyl group containing low molecular weight polymers of olefin such as low molecular weight copolymers of ethylene with acrylic or methacrylic acid.

While the amount of the carboxyl group containing compound used is not very critical, use of the carboxyl group containing compound in an amount of at least 0.5 part, preferably at least 1 part, more preferably at least 2 parts by weight, based on 100 parts by weight of the combined weight of the stock copolymer (A) and the polyamide oligomer (B), is desirable. In the reaction of the stock copolymer (A) with the polyamide oligomer (B) under molten conditions, as the amount of the carboxyl group containing compound is increased, the viscosity of the reaction system is lowered. The resulting graft copolymer is incorporated with the carboxyl group containing compound employed. In cases wherein the graft copolymer should not be incorporated with a lot of the carboxyl group containing compound because of the intended use of the graft copolymer, use of the carboxyl group containing compound in an amount of not more than 100 parts, preferably not more than 20 parts, more preferably not more than 10 parts by weight, based on 100 parts by weight of the combined weight of the stock copolymer (A) and the polyamide oligomer (B), is desirable. However, in cases wherein the graft copolymer is to be used in such a field where it may contain a lot of the carboxyl group containing compound, the graft reaction may be carried out in the presence of more than 100 parts by weight, based on 100 parts by weight of the combined weight of the stock copolymer (A) and the polyamide oligomer (B), of the carboxyl group containing compound.

The use of the carboxyl group containing compound in the reaction of the stock copolymer (A) and the polyamide oligomer (B) is advantageous in that products having better heat resistance and transparency are easily obtained.

The invention further provides a composition for use as a starting material in the preparation of a graft copolymer which comprises a stock copolymer (A) of at least one monomer selected from esters of unsaturated carboxylic acids and vinyl esters (a), ethylene (b) and carbon monoxide (c), and a polyamide oligomer having a primary amino group at one end of its molecule (B), Such a composition according to the invention can be obtained simply by dry blending the stock copolymer (A) with the polyamide oligomer (B), or by intimately admixing both the (A) and (B) under such conditions that they do not substantially react to each other. The composition may be melt extruded, while effecting the desired reaction, into a desired shaped article or onto an adherend to form a desired coating.

The structure of the graft copolymer according to the invention can be confirmed by its $^{13}$C nuclear magnetic resonance absorption spectrum ($^{13}$C-NMR), infrared absorption spectrum (IR) and temperature-melt viscosity curve.

The graft copolymer according to the invention is excellent in heat resistance in that it has a heat distortion temperature higher than that of the starting stock copolymer, and in many cases, the tensile strength at break of the graft copolymer is comparable to or higher than that of the stock copolymer. The graft copolymer according to the invention exhibits good adhesion to non-rigid vinyl chloride resis and other materials, and the adhesion is excellently heat resistant. Furthermore, when laminated with a non-rigid vinyl chloride resin, the graft copolymer is less liable to accept a plasticizer contained in the non-rigid resin, than the stock copolymer is under the same conditions, indicating that an advantage of the graft copolymer according to the invention is that the troubles of getting rigid and surface texture deterioration of the resin may be reduced.

The graft copolymer according to the invention, as such or blended with various additives or other materials, can be used as an adhesive or a heat-sealer for various materials. Adherend materials for which the graft copolymer according to the invention may be suitably used as an adhesive, include, for example, polyvinyl chloride, polyvinylidene chloride, polyester resins, polyamide resins, metals, wood and polyolefin foams. The graft copolymer adhesive may be applied to an adherend by various method, for example, by extrusion coating the graft copolymer onto the adherend, hot pressing a preformed film of the graft copolymer on the adherend, roll coating the graft copolymer onto the adherend by means of a roll coater. When the graft copolymer according to the invention is used as a hot melt adhesive, it may be incorporated with a tackifying resin, a plasticizer and a wax.

The graft copolymer according to the invention may also be used as a modifier resin for various polymers such as polyvinyl chloride, polyamide resins, polyester resins and polycarbonates.

If desired, the graft copolymer according to the invention may be incorporated with various additves such as weathering agents, antioxidants, pigments, dyes, antistatic agents and various fillers.

EFFECT OF THE INVENTION

The novel graft copolymer according to the invention has a high heat distortion temperature and exhibits excellent heat resistance and adhesion properties. It is useful as an adhesive, in particular for non-rigid vinyl chloride resin. When it is used as an adhesive for a non-rigid vinyl chloride resin, a plasticizer contained in the resin is not liable to transfer from the resin to the graft copolymer.

The graft polymer which is excellent in not only heat resistance but also transparency can be easily prepared by effecting the reaction between the stock copolymer (A) and the polyamide oligomer (B) in the presence of a carboxyl group containing compound having a number average molecular weight of from 200 to 10,000 and an acid value of from 15 to 300.

The invention will now be illustrated by the following examples in which parts, percentages and proportions are all by weight, unless otherwise specified.

Methods and conditions for measurement and testing used herein are as follows.

STOCK COPOLYMER

Composition of a stock copolymer was determined by a $^{13}$C-NMR. Chemical shifts of carbon atoms of

derived from vinyl acetate, that of

derived from n-butyl acrylate and that of $>$C$=$O derived from carbon monoxide are 172 ppm, 175 ppm and 214 ppm, respectively.

Melt flow rate was measured at a temperature of 190° C. under a load of 2,160 g.

Weight average molecular weight in terms of polystyrene (PS) was determined by subjecting a stock copolymer solution in o-dichlorobenzene at a temperature of 135° C., using polystyrene as a standard.

POLYAMIDE OLIGOMER

Viscosity in sulfuric acid was measured on a solution of a polyamide oligomer in 98% sulfuric acid, by means of an Ostwald viscometer, in accordance with JIS K 6810.

Number average molecular weight was determined by calculating a number average polymerization degree from the viscosity in sulfuric acid measured as described above in accordance with the following equation and then calculate a number average molecular weight based on the polymerization degree.

Polymerization degree $=$ (Viscosity $-$ 1.05) $\times$ 100. In the case of a copolyamide, the calculation was carried out, assuming the recurring units were 6 nylon.

Melting point was measured by means of a DSC supplied by Du Pont, using a rate of temperature rise of 10° C./10 min.

Content of terminal amino group was determined by titration.

Structure of main chain is indicated in Tables below by marks "6", "6/66", "6/12", and "12/66" designating a polymer of ε-caprolactam, a copolymer of ε-caprolactam and heximethylene diammonium diadipate, a copolymer of ε-caprolactam and ω-laurolactam, and ω-laurolactam and hexamethylene diammonium diadipate, respectively.

GRAFT COPOLYMER

Test sheets for the evaluation of graft copolymers were prepared by compression molding at a temperature of 180° C. or 230° C.

Melt flow rate was measured at a temperature of 190° C. under a load of 2,160 g and at a temperature of 230° C. under a load of 2,160 g.

Tensile strength at break and elongation at break were determined on a No. 4 dummbell test specimen prescribed in JIS K 6301, using a crosshead speed of 200 mm/min.

Endothermic peaks were measured by means of a DSC supplied by Du Pont, using a rate of temperature rise of 10° C./10 min.

Adhesion to non-rigid PVC was measured as follows. A graft copolymer was hot pressed to a sheet having a thickness of 0.2 mm. The sheet was sandwiched between two sheets of a non-rigid PVC (PVC/DOP =100/60, 0.2 mm in thickness), and the assembly was heat sealed at a temperature of 120° C., under a pressure of 1 kg/cm² for 5 seconds to prepare a test specimen. The specimen so prepared was conditioned at a temperature of 23° C. for 1 day and measured for initial adhesion. Also the specimen so prepared was maintained at a temperature of 50° C. for a period of 3 months, conditioned at a temperature of 23° C. for 1 day and measured for adhesion. The adhesion (in kg/25 mm) was measured by T-peel test using an autograph supplied by SHIMAZU Seisakusho at a crosshead speed of 300 mm/min.

Shear adhesive failure temperature was measured as follows. A graft copolymer was hot pressed to a sheet having a thickness of 0.2 mm. The sheet was sandwiched between two sheets of kraft paper, and the assembly was heat sealed at a temperature of 120° C., under a pressure of 1 kg/cm² for 5 seconds to prepare a test specimen. Using the test specimen so prepared, bond failure temperature was determined in accordance with JIS K 6844 under a load of 1 kg and at a rate of temperature rise of 24° C./hr.

DOP swelling (Weight gain after immersion in DOP) was measured as follows. A test piece of 30 mm×10 mm was punched out from a 1 mm thick sheet of a graft copolymer, immersed in dioctyl phthalate (DOP) for a period of 14 days at a temperature of 23° C., and at the end of the period a weight gain in % of the test specimen, which is referred to herein as DOP swelling, was determined.

$^{13}$C nuclear magnetic resonance absorption spectrum was measured on a solution of 600 mg of a copolymer in 3 cc of toluene/2,2,2-trifluoroethanol (1/1).
  Device used: JNM-GX270 (67.8 MHz), supplied by NIPPON DENSHI K.K. (JEOL)
  Temp. of measurement: 63.0° C.
  Number of integrations: 30,000

Fourier transfer infrared absorption spectrum was measured on a pressed sheet of a graft copolymer having a thickness of 0.1 mm in Examples 9 and 10.
  Device used: FTS-40, supplied by BIO RAD K. K.
  Resolution: 4.0 cm$^{-1}$
  Number of integrations: 64

Melt viscosity was measured using an Instron capillary rheometer, at temperatures of 170°, 190°, 210° and 230° C., and at shear rates of 15.8, 52.7, 158, 527, 1580 and 5266 sec$^{-1}$, respectively.

Transparency was visually evaluated on a pressed sheet prepared by compression molding at a temperature of 230° C.

Load drop temperature was determined on the same test specimen as used in testing tensile strength at break, under a load of 2 kg/cm² and at a rate of temperature rise of 24° C./hr.

Infrared absorption spectrum was measured on a pressed sheet having a thickness of 50 μm prepared at a temperature of 230° C. in Example 21, and that of hydrogenated rosin was measured by melt coating the hydrogenated rosin onto a KBr plate.

In the following examples, the graft polymerzation was carried out as follows, unless otherwise specified. A 50 ml laboplast mill supplied by TOYO SEIKI K. K. was heated to the indicated temperature, and charged with the stock copolymer and the polyamide oligomer in an amount of 50 g in total, and with the indicated carboxyl group containing compound in the indicated proportion, and the resulting admixture was melt mixed under conditions including 50 rpm of a rotor and a period of 10 minutes. At the end of the period, the reaction mixture was taken out.

EXAMPLE 1

A Labophast mill was charged with 95 parts of an ethylene-vinyl acetate-carbon monoxide terpolymer (63% of ethylene, 28% of vinyl acetate and 9% of carbon monoxide; melt flow rate of 35 g/10 min. at 190° C.; weight average molecular weight of 141,000 in terms of polystyrene) and 5 parts of nylon 6 oligomer endcapped with n-butyl amine (number average molecular weight of 1,960; $NH_2$ content of $5.1 \times 10^{-4}$ mole/g; melting point of 213° C.), 50 g in total, and the mixture was melt mixed for 10 minutes under conditions of 230° C. and 50 ppm. The resulting graft copolymer was tested. The results are shown in Table 1.

EXAMPLES 2 TO 5

Example 1 was repeated except that the indicated proportion of the indicated polyamide oligomer and the indicated reaction temperature were used. The results are shown in Table 1.

The stock copolymer and polyamide oligomer used in Example 4 as well as the resulting graft copolymer were subjected to thin layer chromatography. A solution of each compound in toluene/2,2,2-trifluoroethanol(1/1) was spotted on a thin layer of silica gel and developed with toluene/2,2,2-trifluoroethanol(1/1) solution. The graft copolymer exhibited Rf value of 0.1. Whereas the stock copolymer exhibited Rf value widely distributing from 0.3 to 0.7. The Rf balue of the polyamide oligomer was 0.

FIG. 1 shows a $^{13}$C-NMR chart of the graft copolymer of Example 4.

COMPARATIVE EXAMPLE 1

Performances of the starting stock copolymer used in Examples 1 to 5 are shown in Table 1.

EXAMPLE 6

A dry blend of 90 parts of pellets of the terpolymer used in Example 1 and 10 parts of powder of the polyamide oligomer used in Example 1 was extruded through a 30 mm single screw extruder (L/D=32, Dullmage screw) under conditions of 40 rpm of screw and 230° C. to prepare a graft copolymer. The results are shown in Table 1.

TABLE 1

|  | Example 1 | Example 2 | Example 3 | Example 4 | Example 5 | Comp. Ex. 1 | Example 6 |
|---|---|---|---|---|---|---|---|
| Stock copolymer | | | | | | | |
| Composition | | | | | | | |

TABLE 1-continued

|  |  | Example 1 | Example 2 | Example 3 | Example 4 | Example 5 | Comp. Ex. 1 | Example 6 |
|---|---|---|---|---|---|---|---|---|
| Vinyl acetate | (wt %) | 28 | 28 | 28 | 28 | 28 | 28 | 28 |
| Ethylene | (wt %) | 63 | 63 | 63 | 63 | 63 | 63 | 63 |
| Carbon monoxide | (wt %) | 9 | 9 | 9 | 9 | 9 | 9 | 9 |
| Melt flow rate | (g/10 min.) | 35 | 35 | 35 | 35 | 35 | 35 | 35 |
| Wt. av. molecular weight in terms of PS | | $1.41 \times 10^5$ | $1.41 \times 10^5$ | $1.41 \times 10^5$ | $1.41 \times 10^5$ | $1.41 \times 10^5$ | $1.41 \times 10^5$ | $1.41 \times 10^5$ |
| Polyamide oligomer | | | | | | | | |
| Structure of main chain | | 6 | 6/66 | 6/66 | 6/12 | 12/66 | — | 6 |
| Viscosity in $H_2SO_4$ | | 1.22 | 1.30 | 1.37 | 1.40 | 1.40 | — | 1.22 |
| M.p. | (°C.) | 213 | 190 | 173 | 147 | 145 | — | 213 |
| Number av. molecular weight | | 1960 | 2830 | 3620 | 3960 | 3960 | — | 1960 |
| Content of —$NH_2$ group $\times 10^4$ | (mole/g) | 5.1 | 3.3 | 2.8 | 2.4 | 2.2 | — | 5.1 |
| Proportion of stock copolymer | (wt %) | 95 | 90 | 90 | 90 | 90 | 100 | 90 |
| Proportion of polyamide oligomer | (wt %) | 5 | 10 | 10 | 10 | 10 | 0 | 10 |
| Reaction temp. | (°C.) | 230 | 200 | 200 | 160 | 160 | — | 230 |
| Graft copolymer | | | | | | | | |
| Melt flow rate at 190° C. | (g/10 min.) | 0.05 | 0.9 | 1.3 | 4.3 | 0.8 | 35 | 16.0 |
| Tensile strength at break | (MPa) | 6.3 | 4.4 | 5.2 | 5.3 | 3.9 | 3.6 | 4.2 |
| Elongation at break | (%) | 770 | 720 | 700 | 820 | 730 | 1030 | 930 |
| Endothermic peaks by DSC | (°C.) | 54,212 | 177 | 56,162 | 53,130 | 53,137 | 45 | — |
| Performances | | | | | | | | |
| Initial adhesion to non-rigid vinyl chloride resin | (kg/25 mm) | 4.5 | 4.1 | 4.3 | 4.6 | 3.9 | 5.4 | — |
| Adhesion to non-rigid vinyl chloride resin after 3 months at 50° C. | (kg/25 mm) | 4.7 | — | — | — | — | 4.3 | — |
| Shear adhesive failure temperature | (°C.) | 130 | 74 | 73 | 72 | 72 | 63 | 138 |
| Wt gain after 14 days immersion in DOP at 23° C. | (%) | 180 | 170 | 165 | 180 | 180 | 285 | 140 |

EXAMPLES 7 TO 14 AND COMPARATIVE EXAMPLE 2

Example 1 was repeated except that an ethylene-n-butyl acrylate-carbon monoxide terpolymer (60% of ethylene, 30% of n-butyl acrylate and 10% of carbon monoxide; melt flow rate of 6 g/10 min. at 190° C.; weight average molecular weight of 420,000 in terms of polystyrene) and the polyamide oligomer indicated in Table 2 in proportions indicated in the same table were reacted. The results are shown in Table 2.

For a comparative purpose, performances of the starting stock copolymer are also shown in the same table as Comparative Example 2.

Figure 2:
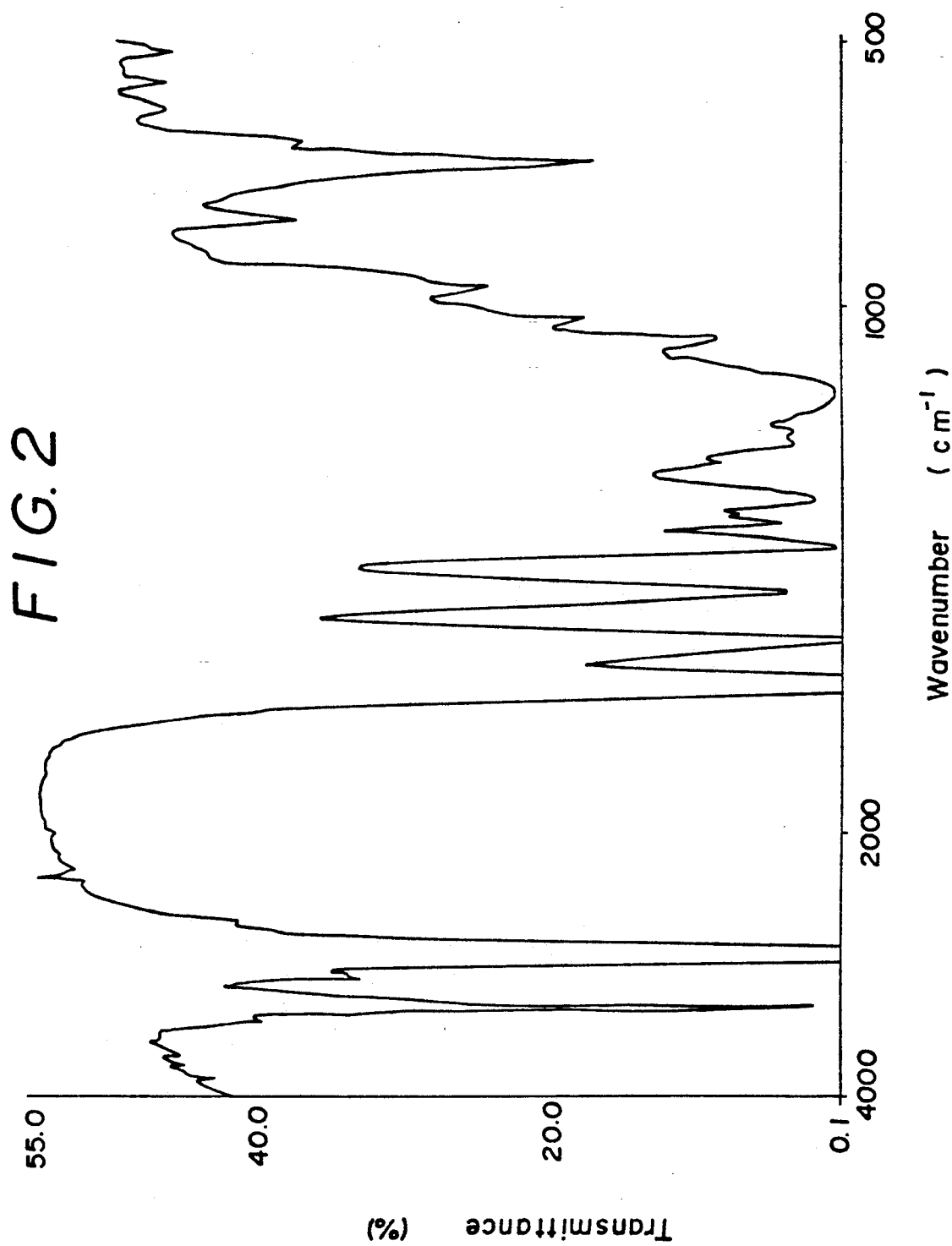
FIG. 2 shows an IR absorption spectrum of a graft copolymer of Example 9.
Figure 3:
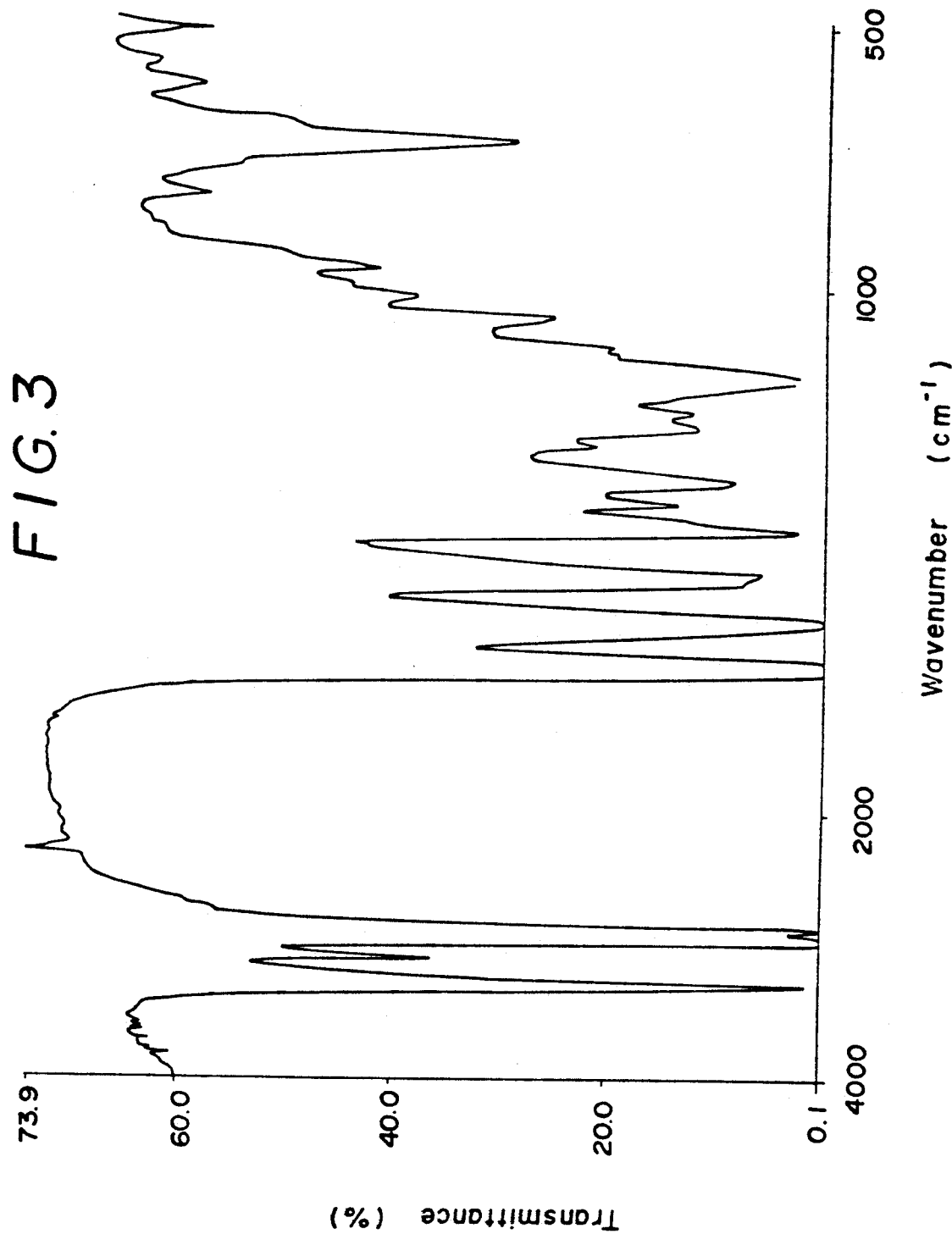
FIG. 3 shows an IR absorption spectrum of a graft copolymer of Example 10.

Infrared absorption spectra of the graft copolymers of Examples 9 and 10 are shown in FIGS. 2 and 3, respectively.

Figure 4:
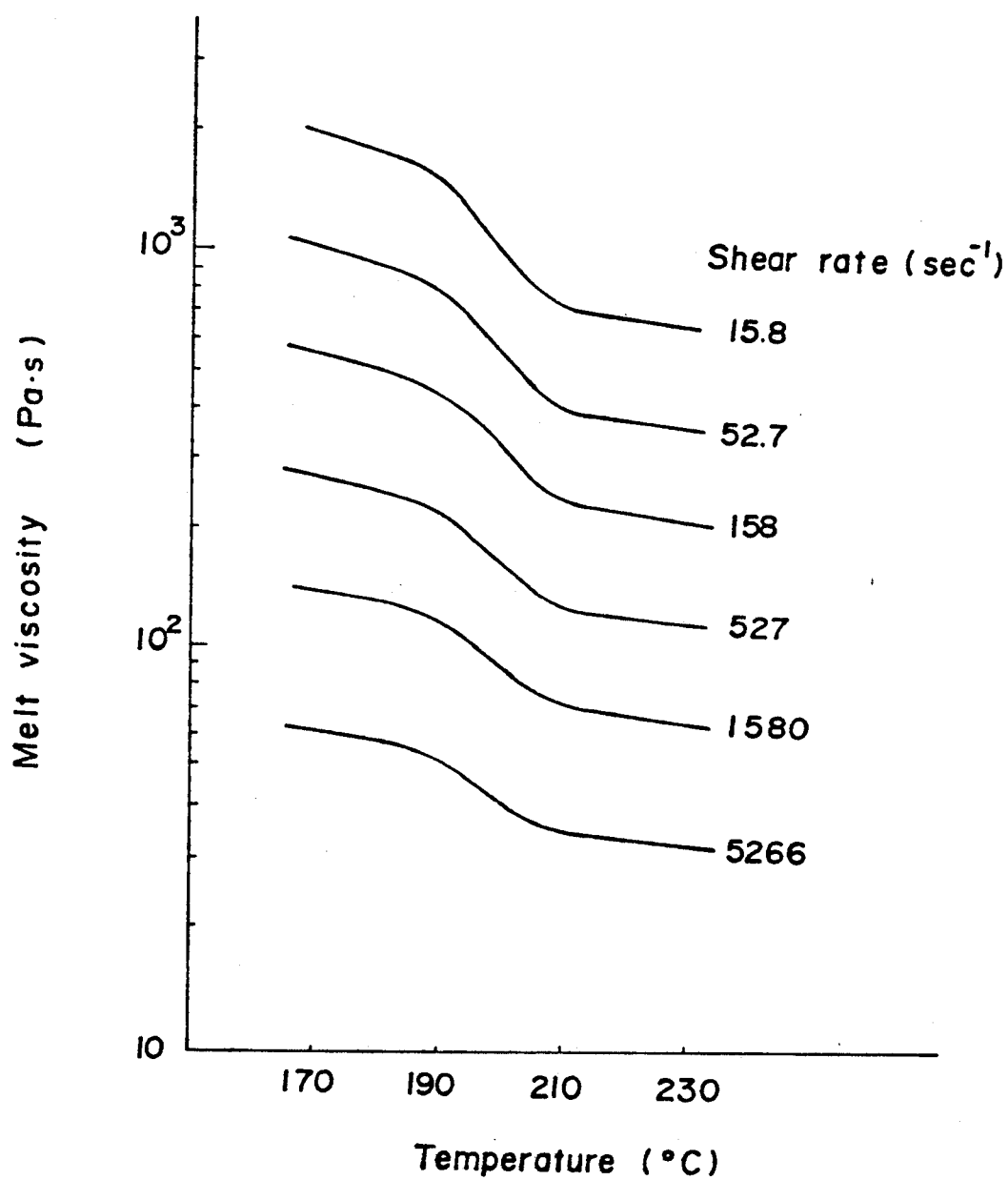
FIG. 4 shows melt behavior (temperature-melt viscosity curves at indicated shear rates) of a graft copolymer of Example 9.

Melt-behavior (temperature-melt viscosity curves) of the graft copolymer of Example 9 is shown in FIG. 4. It is revealed from FIG. 4 that while the melt viscosity decreases as the temperature rises, the viscosity decrease is considerably prominent near the melting point (higher endothermic peak) and fairly moderate above the melting point Such a melt behavior is inherent in graft copolymers.

TABLE 2

|  |  | Example 7 | Example 8 | Example 9 | Example 10 | Example 11 |
|---|---|---|---|---|---|---|
| Stock copolymer | | | | | | |
| Composition | | | | | | |
| n-Butyl acrylate | (wt %) | 30 | 30 | 30 | 30 | 30 |
| Ethylene | (wt %) | 60 | 60 | 60 | 60 | 60 |
| Carbon monoxide | (wt %) | 10 | 10 | 10 | 10 | 10 |
| Melt flow rate | (g/10 min.) | 6 | 6 | 6 | 6 | 6 |
| Wt. av. molecular weight in terms of PS | | $4.2 \times 10^5$ | $4.2 \times 10^5$ | $4.2 \times 10^5$ | $4.2 \times 10^5$ | $4.2 \times 10^5$ |
| Polyamide oligomer | | | | | | |
| Structure of main chain | | 6 | 6 | 6 | 6 | 6/66 |
| Viscosity in $H_2SO_4$ | | 1.22 | 1.22 | 1.22 | 1.22 | 1.30 |
| M.p. | (°C.) | 213 | 213 | 213 | 213 | 190 |
| Number av. molecular weight | | 1960 | 1960 | 1960 | 1960 | 2830 |
| Content of —$NH_2$ group $\times 10^4$ | (mole/g) | 5.1 | 5.1 | 5.1 | 5.1 | 3.3 |
| Proportion of stock copolymer | (wt %) | 98 | 95 | 90 | 80 | 90 |
| Proportion of polyamide oligomer | (wt %) | 2 | 5 | 10 | 20 | 10 |
| Reaction temp. | (°C.) | 230 | 230 | 230 | 230 | 230 |
| Graft copolymer | | | | | | |
| Melt flow rate at 190° C. | (g/10 min.) | 6.5 | 1.1 | 0.6 | 0.05 | 0.06 |
| 230° C. | (g/10 min.) | — | 8.6 | 7.1 | — | 0.29 |
| Tensile strength at break | (MPa) | — | 3.5 | 3.4 | — | 3.1 |

TABLE 2-continued

|  |  |  |  |  |  |  |
|---|---|---|---|---|---|---|
| Elongation at break | (%) | — | 1000 | 990 | — | 530 |
| Endothermic peaks by DSC | (°C.) | — | — | 52,213 | — | — |
| Performances |  |  |  |  |  |  |
| Initial adhesion to non-rigid vinyl chloride resin | (kg/25 mm) | 4.6 | 4.6 | 5.0 | 4.1 | 3.9 |
| Adhesion to non-rigid vinyl chloride resin after 3 months at 50° C. | (kg/25 mm) | 5.0 | 4.6 | 3.3 | 3.2 | — |
| Shear adhesive failure temperature | (°C.) | 69 | 84 | 100 | 138 | 73 |
| Wt gain after 14 days immersion in DOP at 23° C. | (%) | 419 | 370 | 295 | 205 | 241 |

|  |  | Example 12 | Example 13 | Example 14 | Comp. Ex. 2 |
|---|---|---|---|---|---|
| Stock copolymer |  |  |  |  |  |
| Composition |  |  |  |  |  |
| n-Butyl acrylate | (wt %) | 30 | 30 | 30 | 30 |
| Ethylene | (wt %) | 60 | 60 | 60 | 60 |
| Carbon monoxide | (wt %) | 10 | 10 | 10 | 10 |
| Melt flow rate | (g/10 min.) | 6 | 6 | 6 | 6 |
| Wt. av. molecular weight in terms of PS |  | $4.2 \times 10^5$ | $4.2 \times 10^5$ | $4.2 \times 10^5$ | $4.2 \times 10^5$ |
| Polyamide oligomer |  |  |  |  |  |
| Structure of main chain |  | 6/66 | 6/12 | 12/66 | — |
| Viscosity in $H_2SO_4$ |  | 1.37 | 1.40 | 1.40 | — |
| M.p. | (°C.) | 173 | 147 | 145 | — |
| Number av. molecular weight |  | 3620 | 3960 | 3960 | — |
| Content of —$NH_2$ group $\times 10^4$ | (mole/g) | 2.8 | 2.4 | 2.2 | — |
| Proportion of stock copolymer | (wt %) | 90 | 90 | 90 | 100 |
| Proportion of polyamide oligomer | (wt %) | 10 | 10 | 10 | 0 |
| Reaction temp. | (°C.) | 230 | 230 | 230 | — |
| Graft copolymer |  |  |  |  |  |
| Melt flow rate at 190° C. | (g/10 min.) | 0.03 | 0.7 | 0.03 | 6.0 |
| 230° C. | (g/10 min.) | 0.17 | 2.9 | 0.09 | 15.0 |
| Tensile strength at break | (MPa) | 2.8 | 3.0 | 2.8 | 2.9 |
| Elongation at break | (%) | 510 | 610 | 480 | 920 |
| Endothermic peaks by DSC | (°C.) | — | — | — | 52 |
| Performances |  |  |  |  |  |
| Initial adhesion to non-rigid vinyl chloride resin | (kg/25 mm) | 3.8 | 3.6 | 3.5 | 4.8 |
| Adhesion to non-rigid vinyl chloride resin after 3 months at 50° C. | (kg/25 mm) | — | — | — | 3.1 |
| Shear adhesive failure temperature | (°C.) | 75 | 91 | 85 | 66 |
| Wt gain after 14 days immersion in DOP at 23° C. | (%) | 248 | 280 | 254 | 460 |

EXAMPLES 15 TO 18

Example 9 was repeated except that the stock copolymer indicated in Table 3 was used.

The results are shown in Table 3.

EXAMPLE 19

A Labophast mill was charged with 90 parts of an ethylene-n-butyl acrylate-carbon monoxide terpolymer

TABLE 3

|  |  | Example 15 | Example 16 | Example 17 | Example 18 |
|---|---|---|---|---|---|
| Stock copolymer |  |  |  |  |  |
| Composition |  |  |  |  |  |
| n-Butyl acrylate | (wt %) | 25 | 25 | 25 | 9 |
| Ethylene | (wt %) | 66 | 71 | 71 | 69 |
| Carbon monoxide | (wt %) | 9 | 4 | 4 | 12 |
| Melt flow rate | (g/10 min.) | 25 | 90 | 20 | 150 |
| Wt. av. molecular weight in terms of PS |  | $26.3 \times 10^4$ | $14.4 \times 10^4$ | $23.3 \times 10^4$ | $20.0 \times 10^4$ |
| Polyamide oligomer |  |  |  |  |  |
| Structure of main chain |  | 6 | 6 | 6 | 6 |
| Viscosity in $H_2SO_4$ |  | 1.22 | 1.22 | 1.22 | 1.22 |
| M.p. | (°C.) | 213 | 213 | 213 | 213 |
| Number av. molecular weight |  | 1960 | 1960 | 1960 | 1960 |
| Content of —$NH_2$ group $\times 10^4$ | (mole/g) | 5.1 | 5.1 | 5.1 | 5.1 |
| Proportion of stock copolymer | (wt %) | 90 | 90 | 90 | 90 |
| Proportion of polyamide oligomer | (wt %) | 10 | 10 | 10 | 10 |
| Reaction temp. | (°C.) | 230 | 230 | 230 | 230 |
| Graft copolymer |  |  |  |  |  |
| Melt flow rate at 190° C. | (g/10 min.) | 0.27 | 13.1 | 0.77 | 55.0 |
| 230° C. |  | 3.7 | 35.9 | 3.8 | 150 |
| Tensile strength at break | (MPa) | 4.61 | 2.29 | 4.31 | 2.82 |
| Elongation at break | (%) | 740 | 675 | 730 | 590 |
| Performances |  |  |  |  |  |
| Shear adhesive failure temperature | (°C.) | 87 | 73 | 80 | 76 |
| Wt gain after 14 days immersion in DOP at 23° C. | (%) | 154 | 128 | 91 | 97 |

(60% of ethylene, 30% of n-butyl acrylate and 10% of carbon monoxide; melt flow rate of 6 g/10 min. at 190° C.; weight average molecular weight of 420,000 in terms of polystyrene), 10 parts of nylon 6 oligomer end-capped with n-butyl amine (number average molecular weight of 1,960; $NH_2$ content of $5.1 \times 10^{-4}$ mole/g; melting point of 213° C.), the combined weight of the terpolymer and the polyamide oligomer being 50 g, and 3 parts of hydrogenated rosin ("KR 610", supplied by ARAKAWA Kagaku K. K. and having an acid value of 170 and a number average molecular weight of 300), and the mixture was melt mixed for 10 minuts under conditions of 230° C. and 50 ppm. The resulting graft copolymer was tested.

The results are shown in Table 4.

EXAMPLE 20

Example 19 was repeated except that 5 parts of the hydrogenated rosin was additionally used.

The results are shown in Table 4.

EXAMPLE 21

Example 19 was repeated except that 7 parts of the hydrogenated rosin was additionally used.

The results are shown in Table 4.

Figure 5:
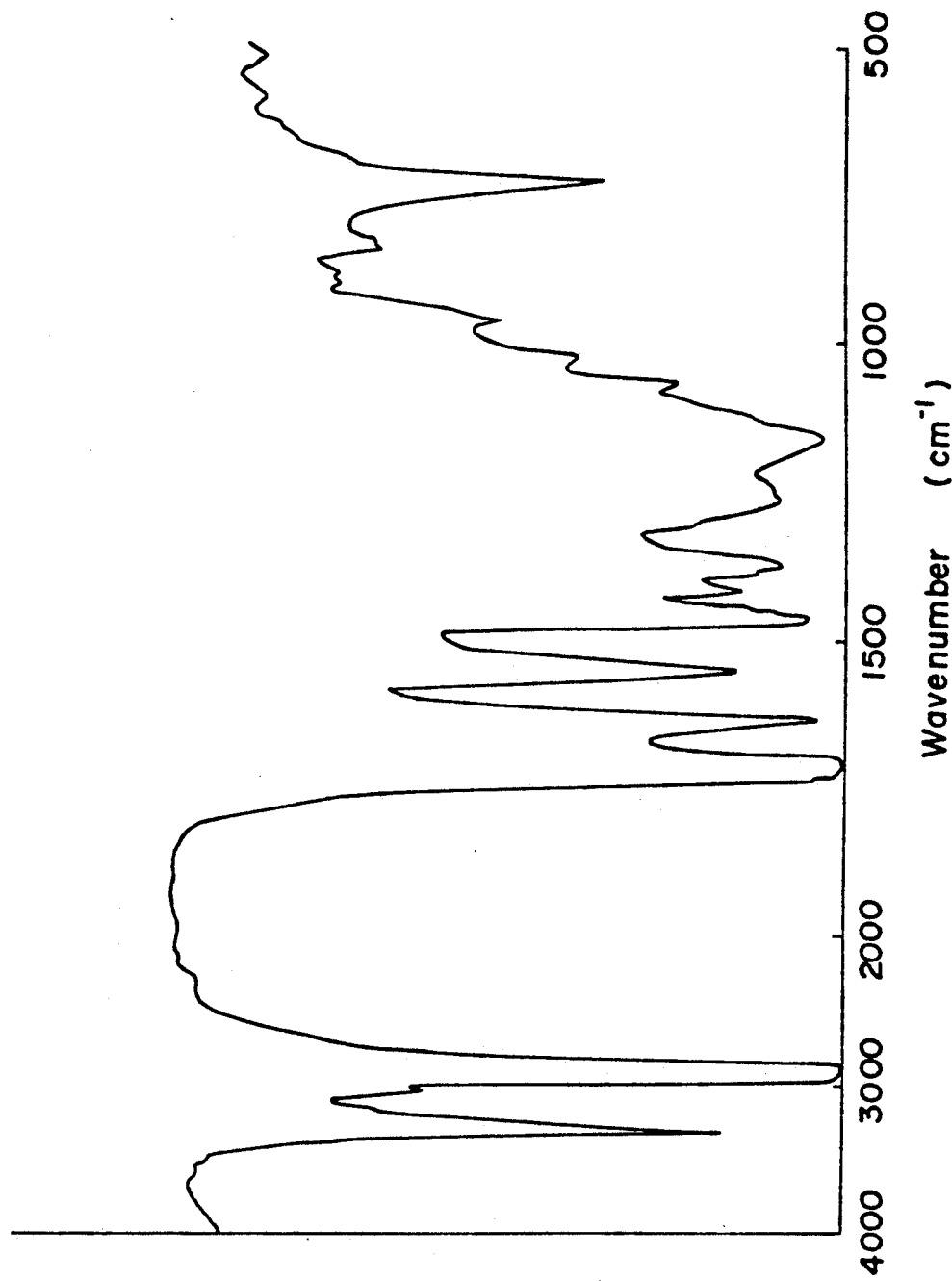
FIG. 5 shows an IR absorption spectrum of a graft copolymer of Example 21 prepared by in the presence of a carboxyl group (hydrogenated rosin)
Figure 6:
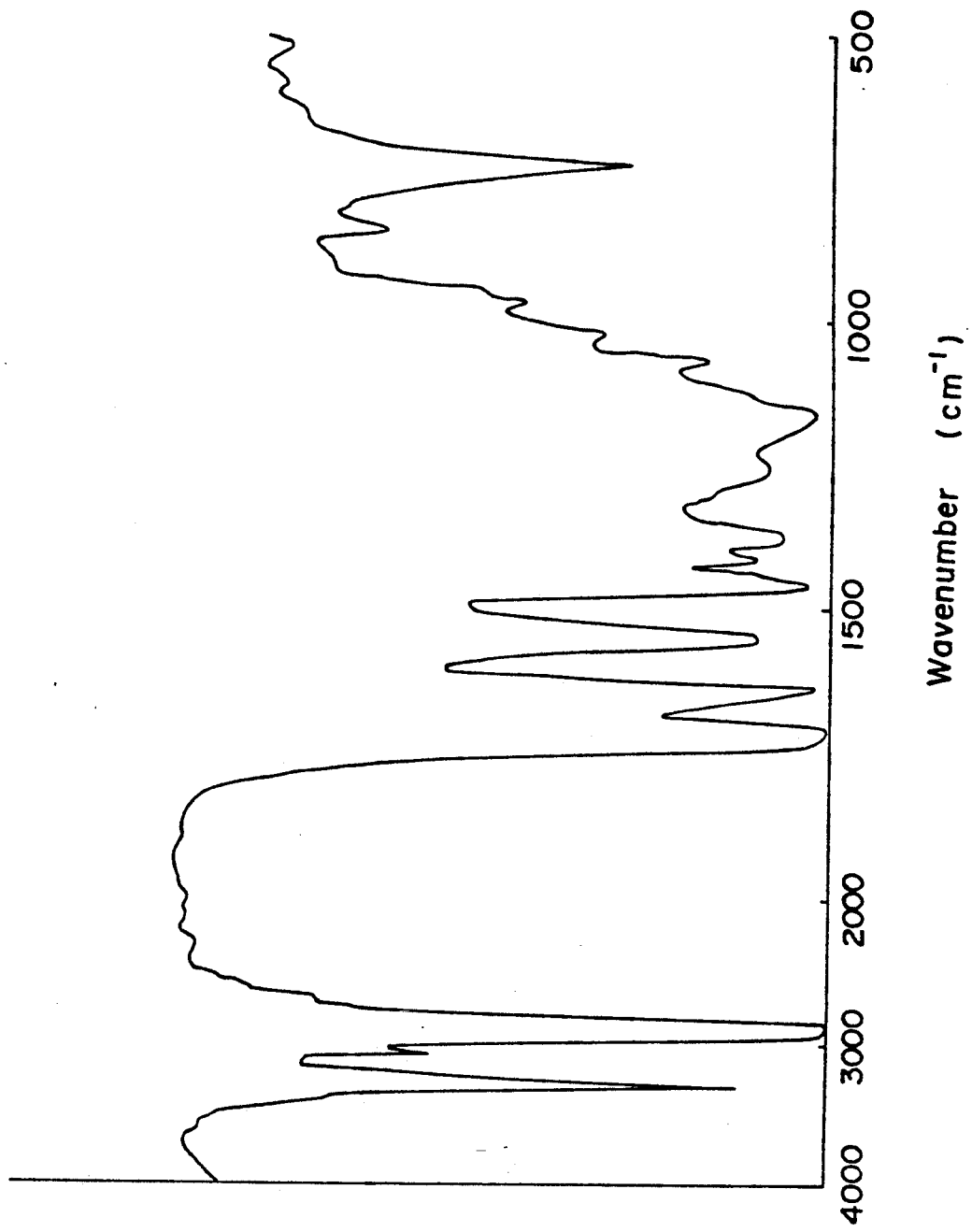
FIG. 6 shows an IR absorption spectrum of the same graft copolymer of Example 21 after extraction of the hydrogenated rosin.
Figure 7:
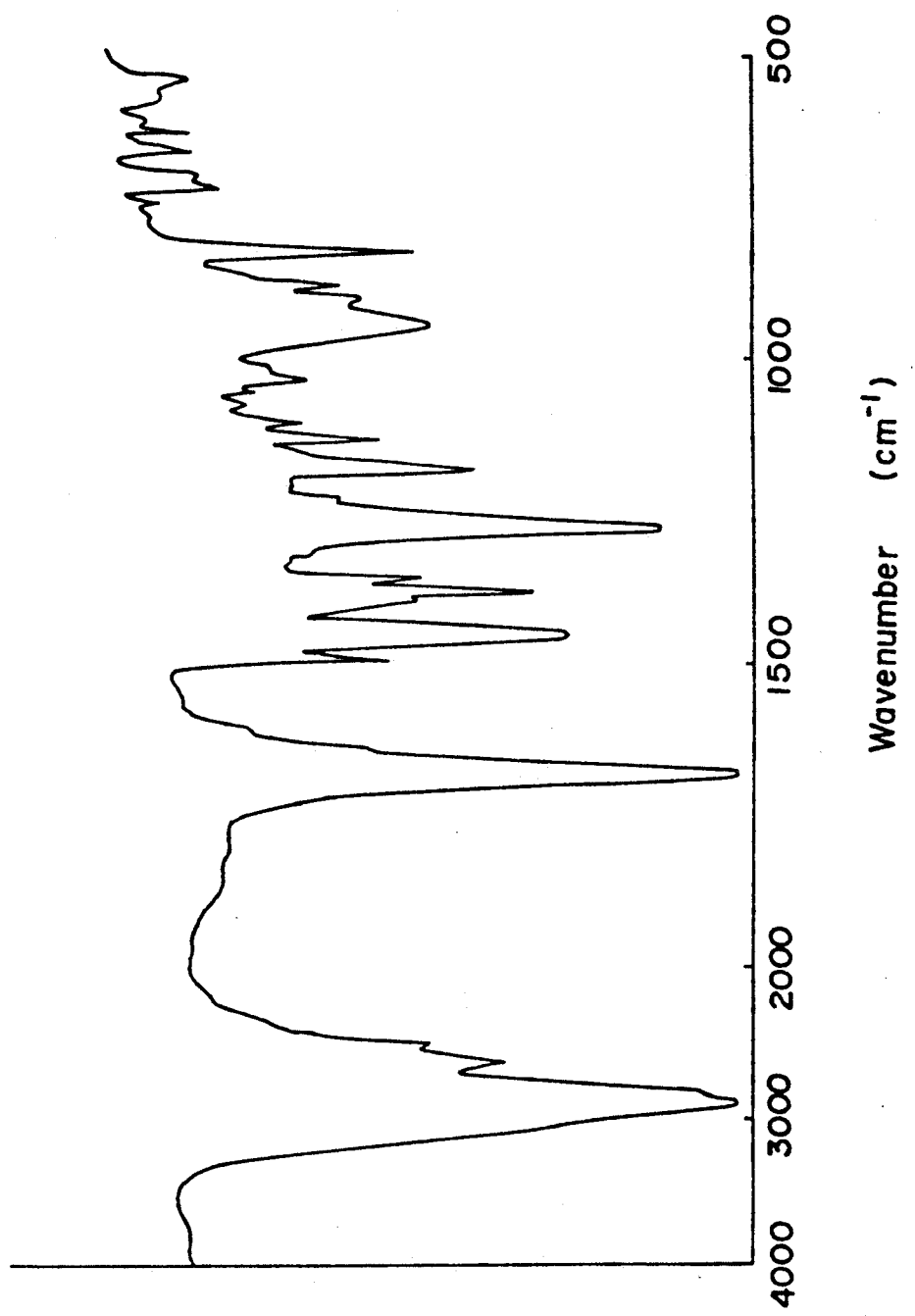
FIG. 7 shows an IR absorption spectrum of the hydrogenated rosin used in Example 21.

One gram of the graft copolymer so prepared was extracted with 200 ml of acetone at room temperature. Infrared absorption spectra of the graft copolymers before and after the extraction are shown in FIGS. 5 and 6, respectively. The absorption based on the hydrogenated rosin appearing in the chart shown in FIG. 5 disappears in the chart shown in FIG. 6, indicating that the hydrogenated rosin is not taken up the reaction system and it would act as a catalyst. FIG. 7 shows an IR absorption spectrum of the hydrogenated rosin used.

EXAMPLES 22 AND 23

Example 19 was repeated except that the hydrogenated rosin was replaced with the indicated proportion of a low molecular weight ethylene-acrylic acid copolymer ("AC 580" supplied by Allied Chemical Company and having an acid value of 75 and a number average molecular weight of 3,200), which is abbreviated as EAA in Table 4.

The results are shown in Table 4.

REFERENCE EXAMPLE 1

Example 19 was repeated except that the hydrogenated rosin was replaced with the indicated proportion of a glycerol ester of a hydrogenated rosin ("KE 811" supplied by ARAKAWA Kagaku K. K., and having an acid value of 10 and a number average molecular weight of 900).

The results are shown in Table 4.

REFERENCE EXAMPLE 2

Example 19 was repeated except that the hydrogenated rosin was replaced with the indicated proportion of a terpene phenolic resin ("IYS polystar T100", supplied by YASUHARA Yushi K. K., and having an acid value of less than 1 and a number average molecular weight of 550).

The results are shown in Table 4.

REFERENCE EXAMPLE 3

Example 19 was repeated except that the hydrogenated rosin was replaced with the indicated proportion of a styrenic hydrocarbon resin ("FTR 6100", supplied by MITSI Petrochemical Industries Ltd., and having an acid value of less than 0.1 and a number average molecular weight of 750).

The results are shown in Table 4.

EXAMPLE 24

Example 20 was repeated except that the polyamide oligomer was replaced with that indicated in Table 4.

The results are shown in Table 4.

REFERENCE EXAMPLE 4

Example 19 was repeated except that the hydrogenated rosin was not used.

The results are shown in Table 4.

TABLE 4

| | | Example 19 | Example 20 | Example 21 | Example 22 | Example 23 |
|---|---|---|---|---|---|---|
| Stock copolymer | | | | | | |
| Composition | | | | | | |
| n-Butyl acrylate | (wt %) | 30 | 30 | 30 | 30 | 30 |
| Ethylene | (wt %) | 60 | 60 | 60 | 60 | 60 |
| Carbon monoxide | (wt %) | 10 | 10 | 10 | 10 | 10 |
| Melt flow rate | (g/10 min.) | 6 | 6 | 6 | 6 | 6 |
| Wt. av. molecular weight in terms of PS | | $4.2 \times 10^5$ | $4.2 \times 10^5$ | $4.2 \times 10^5$ | $4.2 \times 10^5$ | $4.2 \times 10^5$ |
| Polyamide oligomer | | | | | | |
| Structure of main chain | | 6 | 6 | 6 | 6 | 6 |
| Viscosity in $H_2SO_4$ | | 1.22 | 1.22 | 1.22 | 1.22 | 1.22 |
| M.p. | (°C.) | 213 | 213 | 213 | 213 | 213 |
| Number av. molecular weight | | 1960 | 1960 | 1960 | 1960 | 1960 |
| Content of —$NH_2$ group $\times 10^4$ | (mole/g) | 5.1 | 5.1 | 5.1 | 5.1 | 5.1 |
| Additive | | | | | | |
| Kind (general name) | | Hydrogenated rosin | Hydrogenated rosin | Hydrogenated rosin | EAA | EAA |
| Acid value | (KOH mg/g) | 170 | 170 | 170 | 75 | 75 |
| Number av. molecular weight | | 300 | 300 | 300 | 3200 | 3200 |
| Proportion of stock copolymer | (wt %) | 90 | 90 | 90 | 90 | 90 |
| Proportion of polyamide oligomer | (wt %) | 10 | 10 | 10 | 10 | 10 |
| Proportion of additive | (wt %) | 3 | 5 | 7 | 5 | 10 |
| Reaction temp. | (°C.) | 230 | 230 | 230 | 230 | 230 |
| Graft copolymer | | | | | | |
| Melt flow rate at 190° C. | (g/10 min.) | 0.02 | 0.01 | 0.01 | 0.05 | 0.01 |
| 230° C. | (g/10 min.) | 2.3 | 2.5 | 2.7 | 2.5 | 2.5 |
| Tensile strength at break | (MPa) | 4.99 | 4.53 | 4.79 | 5.17 | — |
| Elongation at break | (%) | 550 | 530 | 470 | 670 | — |
| Performances | | | | | | |

TABLE 4-continued

| | | | | | | |
|---|---|---|---|---|---|---|
| Transparency | | Transparent | Transparent | Transparent | Translucent | Translucent |
| Load drop temp. | (°C.) | 86 | 89 | 85 | 76 | 110 |
| Shear adhesive failure temperature | (°C.) | — | 204 | — | 199 | 190 |
| Wt gain after 14 days immersion in DOP at 23° C. | (%) | — | 131 | — | 158 | 137 |

| | | Ref. Ex. 1 | Ref. Ex. 2 | Ref. Ex. 3 | Example 24 | Ref. Ex. 4 |
|---|---|---|---|---|---|---|
| Stock copolymer | | | | | | |
| Composition | | | | | | |
| n-Butyl acrylate | (wt %) | 30 | 30 | 30 | 30 | 30 |
| Ethylene | (wt %) | 60 | 60 | 60 | 60 | 60 |
| Carbon monoxide | (wt %) | 10 | 10 | 10 | 10 | 10 |
| Melt flow rate | (g/10 min.) | 6 | 6 | 6 | 6 | 6 |
| Wt. av. molecular weight in terms of PS | | $4.2 \times 10^5$ | $4.2 \times 10^5$ | $4.2 \times 10^5$ | $4.2 \times 10^5$ | $4.2 \times 10^5$ |
| Polyamide oligomer | | | | | | |
| Structure of main chain | | 6 | 6 | 6 | 6/12 | 6 |
| Viscosity in $H_2SO_4$ | | 1.22 | 1.22 | 1.22 | 1.40 | 1.22 |
| M.p. | (°C.) | 213 | 213 | 213 | 147 | 213 |
| Number av. molecular weight | | 1960 | 1960 | 1960 | 3960 | 1960 |
| Content of —$NH_2$ group $\times 10^4$ | (mole/g) | 5.1 | 5.1 | 5.1 | 2.4 | 5.1 |
| Additive | | | | | | |
| Kind (general name) | | Glycerol ester of hydrogenated rosin | Terpene phenol | Styrenic hydrocarbon | Hydrogenated rogin | |
| Acid value | (KOH mg/g) | 10 | <1 | <0.1 | 170 | — |
| Number av. molecular weight | | 900 | 550 | 750 | 300 | — |
| Proportion of stock copolymer | (wt %) | 90 | 90 | 90 | 90 | 90 |
| Proportion of polyamide oligomer | (wt %) | 10 | 10 | 10 | 10 | 10 |
| Proportion of additive | (wt %) | 5 | 5 | 5 | 5 | 0 |
| Reaction temp. | (°C.) | 230 | 230 | 230 | 230 | 230 |
| Graft copolymer | | | | | | |
| Melt flow rate at 190° C. | (g/10 min.) | 1.3 | 4.2 | 4.8 | 2.6 | 0.6 |
| 230° C. | (g/10 min.) | 14.7 | 21.4 | 21.4 | — | 7.1 |
| Tensile strength at break | (MPa) | 3.51 | 3.72 | 3.12 | 3.36 | 3.4 |
| Elongation at break | (%) | 815 | 970 | 810 | 580 | 990 |
| Performances | | | | | | |
| Transparency | | Opaque | Opaque | Opaque | Transparent | Opaque |
| Load drop temp. | (°C.) | 60 | 59 | 57 | 56 | 54 |
| Shear adhesive failure temperature | (°C.) | 153 | 120 | 111 | 120 | 100 |
| Wt gain after 14 days immersion in DOP at 23° C. | (%) | 196 | 226 | 225 | 192 | 295 |

What is claimed is:

1. A process for the preparation of a graft copolymer which comprises graft polymerizing:

1 to 40% by weight, based on the weight of said graft copolymer, of a polyamide oligomer (B) having a primary amino group at one end of its molecule and a carboxyl group at another end of its molecule, said carboxyl group being encapsulated with a primary amine having from 1 to 20 carbon atoms, said polyamide oligomer having a number average molecular weight of from 600 to 10,000; onto a stock copolymer (A) including at least one monomer selected form esters of unsaturated carboxylic acids (a), ethylene (b) and carbon monoxide (c), said stock copolymer (A) having a weight average molecular weight of from $10^4$ to $10^6$, wherein said polyamide oligomer is graft polymerized onto said stock copolymer is the presence of a carboxyl group containing compound being selected from the group consisting of rosin, hydrogenated rosin, a low molecular weight copolymer of ethylene and and acrylic acid and a low molecular weight copolymer of ethylene and methacrylic acid, said compound having a number average molecular weight of from 200 to 10,000 and an acid value of from 15 to 300.

2. A composition for use as a starting material in the preparation of a graft copolymer which comprises:

a stock copolymer (A) including at least one monomer selected from esters of unsaturated carboxylic acids (a), ethylene (b) and carbon monoxide (c), said stock copolymer (A) having a weight average molecular weight of from $10^4$ to $10^6$;

1 to 40% by weight, based on the weight of said graft copolymer, of a polyamide oligomer (B) having a primary amino group at one end of its molecule and a carboxyl group at another end of its molecule, said carboxyl group being encapsulated with a primary amine having from 1 to 20 carbon atoms, said polyamide oligomer having a number average molecular weight of from 600 to 10,000, and a carboxyl group containing compound being selected from the group consisting of rosin, hydrogenated rosin, a low molecular weight copolymer of ethylene and acrylic acid and a low molecular weight copolymer of ethylene and methacrylic acid, said compound having a number average molecular weight of from 200 to 10,000 and an acid value of from 15 to 300.

* * * * *

UNITED STATES PATENT AND TRADEMARK OFFICE
CERTIFICATE OF CORRECTION

PATENT NO. : 5,300,548

DATED : April 5, 1994

INVENTOR(S) : HIDEO AKIMOTO, SHIRO NARASAKI AND REIJI MIYAMOTO

It is certified that error appears in the above-indentified patent and that said Letters Patent is hereby corrected as shown below:

Title page, item [30], under Foreign Application Priority Data, "Aug. 17, 1989 [JP] Japan ... 1-65423" should read --Mar. 17, 1989 [JP] Japan ... 1-65423--.

Column 1 Lines 8 and 9 delete "copending" (both occurrences).

Column 1 Line 11 "August" should read --September--.

Column 2 Line 17 "bas" should read --has--.

Column 5 Line 29 "I" should read --1--.

Column 9 Lines 8-9 "between-two" should read --between two--.

Column 13 Line 41 "3was" should read --3 was--.

Column 16 Line 18 "IYS" should read --"YS --.

UNITED STATES PATENT AND TRADEMARK OFFICE
CERTIFICATE OF CORRECTION

PATENT NO. : 5,300,548
DATED : April 5, 1994
INVENTOR(S) : Hideo Akimoto, Shiro Narasaki and Reiji Miyamoto It is certified that error appears in the above-indentified patent and that said Letters Patent is hereby corrected as shown below:

Table 4, Example 24, Column 18 "rogin" should read --rosin--.

Claim 1 Line 58 Column 17 "is" should read --in--.

Claim 1 Line 62 Column 17 "ethylene and and" should read --ethylene and--.

Signed and Sealed this

Sixth Day of September, 1994

Attest:

BRUCE LEHMAN

Attesting Officer

Commissioner of Patents and Trademarks